US009218749B2

(12) United States Patent
Song et al.

(10) Patent No.: US 9,218,749 B2
(45) Date of Patent: Dec. 22, 2015

(54) SYSTEM AND METHOD FOR MONITORING BEHAVIOR OF STUDENTS IN FIELD TRIPS

(71) Applicant: KOREA ADVANCED INSTITUTE OF SCIENCE AND TECHNOLOGY, Daejeon (KR)

(72) Inventors: June Hwa Song, Daejeon (KR); In Seok Hwang, Daejeon (KR); Hyuk Jae Jang, Gyeonggi-do (KR); Tai Woo Park, Daejeon (KR); A Ram Choi, Daejeon (KR); Young Ki Lee, Daejeon (KR); Chan You Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 164 days.

(21) Appl. No.: 13/919,034

(22) Filed: Jun. 17, 2013

(65) Prior Publication Data

US 2014/0220524 A1 Aug. 7, 2014

(30) Foreign Application Priority Data

Feb. 5, 2013 (KR) .......................... 10-2013-0013082

(51) Int. Cl.
*G09B 19/00* (2006.01)

(52) U.S. Cl.
CPC ...................................... *G09B 19/00* (2013.01)

(58) Field of Classification Search
CPC ................... A63B 2024/0025; A63B 24/0062; G09B 19/00; G09B 19/003; G09B 19/0007; G09B 19/0015
See application file for complete search history.

(56) References Cited

U.S. PATENT DOCUMENTS

| 6,569,011 B1* | 5/2003 | Lynch et al. | 463/1 |
| 2013/0115584 A1* | 5/2013 | Gordon et al. | 434/247 |

\* cited by examiner

*Primary Examiner* — Timothy A Musselman

(57) ABSTRACT

Provided is a system and method for monitoring a student behavior in a field trip. The system may include: a plurality of member terminals held respectively by a plurality of members conducting a group activity and provided with a plurality of sensors, an imaging device, and a data storage device to collect and store behavior information of the members to match time information, the behavior information including location information, orientation information, view information, and motion information; at least one leader terminal held by a leader and configured to receive and store the behavior information of the members collected by the plurality of member terminals; and an analysis terminal configured to receive the behavior information from the at least one leader terminal and the plurality of member terminals.

18 Claims, 5 Drawing Sheets

SYSTEM AND METHOD FOR MONITORING BEHAVIOR OF STUDENTS IN FIELD TRIPS

CROSS-REFERENCE TO RELATED APPLICATION

This application claims priority of Korean Patent Application No. 10-2013-0013082, filed on Feb. 5, 2013, in the KIPO (Korean Intellectual Property Office), the disclosure of which is incorporated herein entirely by reference.

BACKGROUND OF THE INVENTION

1. Field of the Invention

The present disclosure relates to a system and method for monitoring a student behavior, and more particularly, to a system and method for monitoring a student behavior in a field trip.

2. Description of the Related Art

Recently, educational institutions such as, for example, schools or kindergartens, support various forms of education, for example, experience-based outdoor education such as a museum visit and the like, beyond the limits of traditional text-based indoor education. The outdoor education may include all types of field trip activities that may be conducted in various places aside from a classroom, rather than simple outdoor activities.

In a field trip, at least one leader, for example, a teacher often guides a group of members, for example, students. Because a field trip is conducted in an open space rather than a closed space such as, for example, a class room, a leader guides students in consideration of safety of students as the highest priority, to prevent a missing child or an injury.

However, even though a leader pays attention to safety of students and the students also obey the guidance of the teacher, a safety incident may occur. In particular, as a leader guides a greater number of students and younger students, the leader pays higher attention to safety of the students.

In addition to safety, when students are so young to take care of, for example, to help them go to a toilet and take food, a leader needs to take care of the students directly due to an unfamiliar outdoor environment.

Because a field trip is one of the various types of education, a leader needs to assess learning and attitude of students, for example, a field of interest, in a field trip. That is, a leader needs to evaluate academic achievement from a field trip. However, as described in the foregoing, a leader cannot afford to actually monitor academic achievement of students because the leader pays the maximum attention to and concentrates on safety and management of the students. Accordingly, there is a demand for an alternative to monitor academic achievement of students in a field trip.

SUMMARY OF THE INVENTION

The present disclosure is directed to providing a system and method for monitoring a student behavior that may monitor and store behaviors of individual students in a field trip, to allow a leader to evaluate academic achievement for each student through analysis of behavioral features in the monitored behaviors of the students.

Accordingly, the system and method for monitoring a student behavior in a field trip may monitor and store learning processes of students on a field trip, to allow a leader to pay full attention to safety of students during the field trip and to evaluate academic achievement through analysis of the learning processes for each student after the field trip. Also, to overcome a difficulty of the leader in analyzing all learning processes of a plurality of students, behavioral features may be extracted and displayed to the leader to enable the leader to intensively observe specific behaviors. Accordingly, the leader may easily obtain a result of monitoring the feature behaviors of the students, so that the leader may recognize and respond to talents or problems of the students quickly in an early stage.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
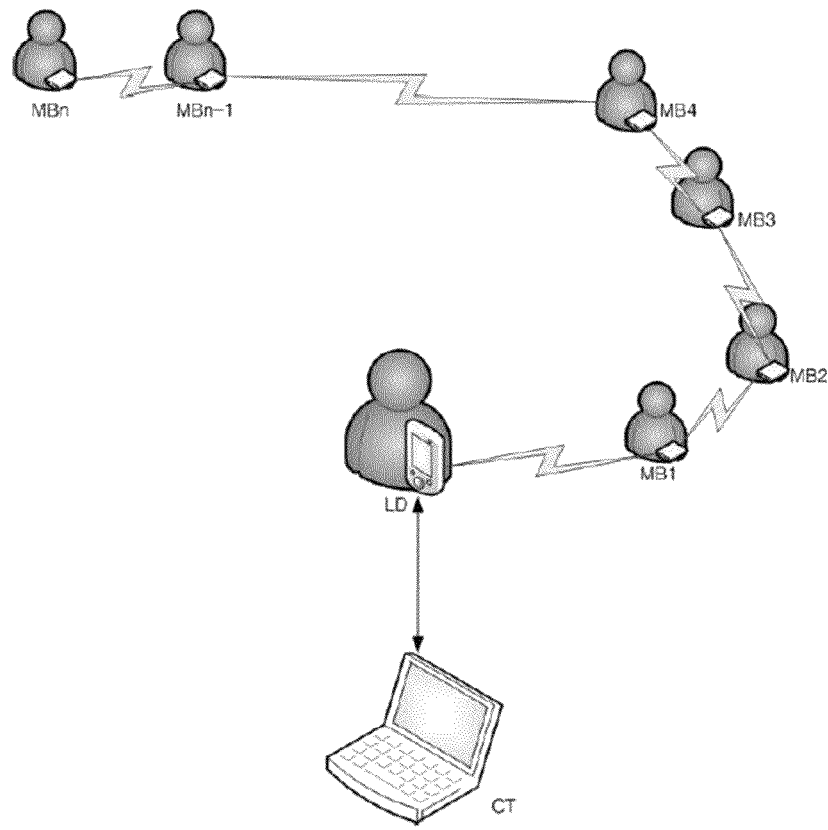
FIG. 1 is a diagram illustrating a system for monitoring a field trip according to an exemplary embodiment.

FIG. 1 is a diagram illustrating a system for monitoring a field trip according to an exemplary embodiment.

Referring to FIG. 1, the system for monitoring a field trip according to an exemplary embodiment may include at least one leader terminal LD, a plurality of member terminals MB1 through MBn, and an analysis terminal CT.

The plurality of member terminals MB1 through MBn may be each held by a plurality of members, for example, students, conducting a group activity, and may collect and store behavior information for each of corresponding members. Each of the plurality of member terminals MB1 through MBn may include a plurality of sensors, an imaging device, and a data storage device, to collect behavior information of the corresponding members during a field trip. The behavior information of the member may include location information, orientation information, view information, and motion information of the member per time. Each of the plurality of member terminals MB1 through MBn may transmit all or some of the stored behavior information of the members to the at least one leader terminal LD. The behavior information to be transmitted to the leader terminal LD may be preset.

The at least one leader terminal LD may be each held by at least one leader, and may receive and store all or some of the behavior information for each of the members from the plurality of member terminals MB1 through MBn. The at least one leader terminal LD may wirelessly receive and store the behavior information for each of the plurality of members stored in the plurality of member terminals MB1 through MBn. Because the leader terminal LD receives the behavior information from the plurality of member terminals MB1 through MBn, when the leader terminal LD receives all the behavior information stored in the plurality of member terminals MB1 through MBn, an amount of data to be transmitted may increase dramatically, which may make it unfavorable to receive data and may require a very large storage capacity. As described in the foregoing, the leader cannot afford to monitor a behavior for each of the plurality of members during the field trip. Accordingly, the leader may analyze the result of monitoring the field trip separately after the field trip. Also, the leader may pick up the plurality of member terminals MB1 through MBn after the field trip. For the leader terminal LD to receive and store all the behavior information may be unreasonable. Accordingly, the leader terminal LD may receive only necessary behavior information among the behavior information stored in the plurality of member terminals MB1 through MBn in the field trip. A representative example of the behavior information received by the leader terminal LD may include a location of the member. The location of the member may be used for the leader to recognize and locate a deviated member quickly when a particular member gets out of a group conducting a field trip activity in the field trip.

The analysis terminal CT may analyze a behavior for each of the plurality of members by the leader receiving and analyzing the behavior information stored in the at least one leader terminals LD and the plurality of member terminals MB1 through MBn after the field trip. The analysis terminal CT may analyze a result of monitoring the field trip for each of the plurality of members. The analysis terminal CT may obtain a feature by collecting and analyzing the behavior information of the members received from the at least one leader terminals LD and the plurality of member terminals MB1 through MBn, to enable the leader to distinguish a member of interest and to monitor behavior information of the member of interest. The analysis terminal CT may allow the leader to easily monitor the behavior of the member in the field trip. The reason of obtaining the feature from the behavior information of the members is that the leader may obtain, in a group activity such as a field trip, a greater amount of information associated with academic achievement from feature activities conducted by a minority ratio of the members, for example, at least one member, differently from the other members, rather than a common activity conducted commonly by a majority ratio of the members. Also, the analysis terminal CT may transmit the analysis result to the leader terminal LD to allow the leader to recognize the analysis result.

In the field trip, students may face a new environment differing from a daily environment, and thus, may interact with a peer student or a surrounding object differently from the way the students usually interact. Such an interaction may be expressed as an unexpected activity even to the leader, such as a teacher, observing students in a daily environment. When such an activity is observed by the leader, the leader may discover new attitudes and talents of the students that have been not perceived so far.

When one of the plurality of students conducts a feature activity different from those of the other students, the student conducting the feature activity may be determined to have found a matter of a special interest or may be determined not to get interested in a matter to be concentrated. Take a museum visit as an example of the field trip. When the leader or a museum guide talks about one of the exhibitions being displayed, most of the students may see the corresponding exhibition. However, if a student sees a different exhibition dissimilar to the other students, the corresponding student may be determined to have a special interest in the exhibition being viewed or may be determined not to get interested in the exhibition currently being explained. Accordingly, a field of interest of the corresponding student may be recognized. The leader may pay higher attention to a feature activity than a common activity conducted by a majority of members.

Attempts have been made to monitor a student behavior using an imaging technology such as, for example, a video recording, in a field trip. However, because video recording does not provide a function of searching for a feature activity, a leader needs to directly see and analyze a full video taken for a plurality of members. Actually, it is impossible for the leader to analyze the video, and as a result, utility as academic achievement is low. However, in an exemplary embodiment, the analysis terminal CT may search for a content of a behavior of a member conducting a feature activity and may provide a search result to a leader, to allow the leader to conduct a content analysis of the feature activity of the member and to easily recognize academic achievement.

In an exemplary embodiment, if the plurality of member terminals MB1 through MBn and the at least one leader terminals LD are operated directly by the members and the leader, which may cause inconvenience to activities of the members and the leader and consequently may impede substantial use. In particular, manipulating the member terminals MB1 through MBn in a new environment may be a vexatious task to young students during a field trip. As described in the foregoing, because the leader pays high attention to safety of students, the leader may not afford to manipulate the leader terminal LD. Accordingly, the plurality of member terminals MB1 through MBn and the at least one leader terminals LD may be implemented in pursuit of a pervasive technology to sense and store member behaviors automatically without manipulation by the members or the leader.

The pervasive technology proposes interactions between humans, computing devices, and environment, to create a computing environment where computing devices are connected to a network of other devices in such a way that connectivity is unobstructive and always available. The pervasive technology may move towards computing devices with embedded technology and connectivity and interaction between computing devices and humans. In this environment, computing devices execute processing to human needs, instead of humans being forced to master a fit technology for a computing device to execute a desired task, which requires a great amount of time. Accordingly, in an exemplary embodiment, if the plurality of member terminals MB1 through MBn and the at least one leader terminals LD may be implemented in pursuit of a pervasive technology, the leader or the plurality of members may not need to manipulate the plurality of member terminals MB1 through MBn and the at least one leader terminals LD separately, and after the field trip, the leader may collect behavior information for each of the plurality of members stored in the plurality of member terminals MB1 through MBn and the at least one leader terminals LD.

Figure 2:
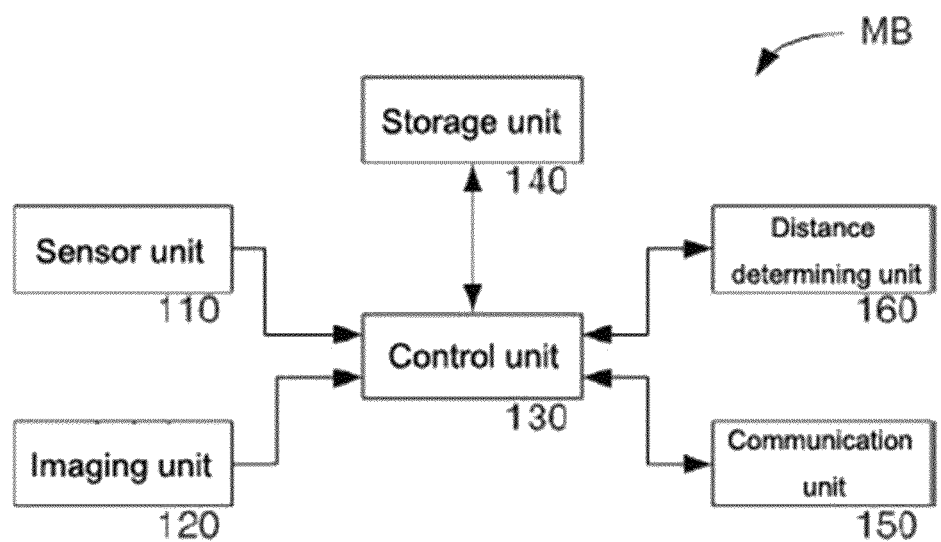
FIG. 2 is a diagram illustrating an example of a detailed configuration of a member terminal of FIG. 1.

FIG. 2 is a diagram illustrating an example of a detailed configuration of the member terminal of FIG. 1.

Referring to FIG. 2, each of the member terminals MB1 through MBn may include a sensor unit 110, an imaging unit 120, a control unit 130, a storage unit 140, a communication unit 150, and a distance determining unit 160.

The sensor unit 110 may include a compass sensor and an accelerator sensor. The compass sensor may sense an orientation of the member terminal, and the accelerator sensor may sense a motion of the member terminal, and a sensing value may be transmitted to the control unit 130. The compass sensor and the accelerator sensor may collect, respectively, a body orientation and an activity intensity of students cyclically, for example, in 20 hertz (Hz). In addition to the compass sensor and the accelerator sensor, the sensor unit 110 may further include a Gyro sensor.

The imaging unit 120 may obtain a frontal image for each of the member terminals in a preset time unit, for example, one frame every 44 seconds.

The control unit 130 may receive the sensing value obtained by the sensor unit 110 and the image obtained by the imaging unit 120, and may store the sensing value and the image in the storage unit 140. Also, the control unit 130 may determine a separation of a member from a group or an independent activity of a member, from distances between the member terminals MB1 through MBn obtained by the distance determining unit 160.

The communication unit 150 may communicate with the leader terminal LD, and may transmit, to the leader terminal LD, behavior information including at least one of the sensing value and the image stored in the storage unit 140, and in a case in which the control unit 130 determines a separation of a member terminal from a group, may transmit a warning to the leader terminal LD.

The distance determining unit 160 may transmit and receive a radio wave to and from another member terminal. The distance determining unit 160 may determine a distance between member terminals based on an intensity of the radio wave received from the another member terminal, and may transmit the distance to the control unit 130. The distance determining unit 160 may transmit and receive a signal in a radio frequency band, for example, 2.4 gigahertz (GHz), to and from another member terminal cyclically, for example, in 2 Hz, and may determine a distance from the another member terminal based on a strength of the radio frequency signal received from the another member terminal. A method of determining a distance of a transmitting terminal using a strength of a received signal is well known in the art, and among various techniques, a received signal strength indicator (RSSI) technique may be applied to an exemplary embodiment.

Accordingly, each of the member terminals MB1 through MBn may store, in the storage unit 140, the sensing value obtained by the sensor unit 110 and the image obtained by the imaging unit 120 as behavior information of the corresponding members, may determine a distance from another member terminal, and may transmit at least one of the sensing value, the image, and the determined distance from the another member terminal to the at least one leader terminal LD.

Figure 3:
FIG. 3 is a diagram illustrating an example of actual application of a member terminal of FIG. 2.

FIG. 3 is a diagram illustrating an example of actual application of the member terminal of FIG. 2.

Referring to FIG. 3, the member terminal may be provided to, for example, bag shoulder straps of students, and may be implemented as a smart phone. The reason of providing the member terminals to bags of students is that most of students shoulder bags during a field trip. In particular, because kindergarten kids participate in a field trip with bags of the same type generally provided from a kindergarten on their shoulders, attaching the member terminals to the bags may be adequate. To obtain an accurate image or sensing value corresponding to a view direction, the member terminal may be attached to a device enabling fixation to a head in the view direction, for example, a hat or cap. However, in this case, headache may occur due to a weight of the member terminal and students may be reluctant to attach the member terminal to a hat or cap due to appearance. For this reason, the member terminals may be attached to bag shoulder straps as shown in FIG. 3.

The reason of implementing the member terminal as a smart phone is that the member terminal may be easily implemented only by installing a simple software program on a smart phone having various types of sensors, a camera, and a communication function. In a case in which the distance determining unit 160 uses a global positioning system (GPS)-based technology, a smart phone may be used intactly. However, because a GPS-based location tracking technology is used based on satellite communication, the GPS-based location tracking technology does not work indoor. A group activity may be conducted outdoor, and there may be various indoor group activities including, for example, a museum visit, performance viewing, and the like. Accordingly, a system for recognizing a deviated member form a group may use a radio frequency wave to providing outdoor and indoor perception of a deviated member. When the distance determining unit 160 uses a radio frequency wave, the member terminal may be implemented as a separate device from a smart phone, as shown in FIG. 3, since a smart phone does not support a radio frequency wave.

Figure 4:
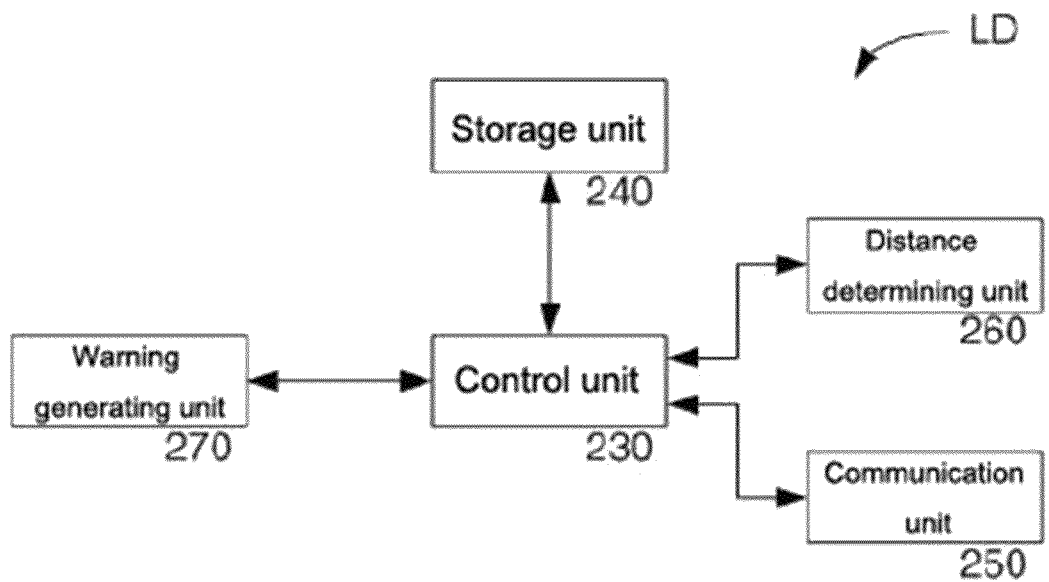
FIG. 4 is a diagram illustrating an example of a detailed configuration of a leader terminal of FIG. 1.

FIG. 4 is a diagram illustrating an example of a detailed configuration of the leader terminal LD of FIG. 1.

Referring to FIG. 4, the lead terminal LD may include a control unit 230, a storage unit 240, a communication unit 250, a distance determining unit 260, and a warning generating unit 270.

The distance determining unit 260 may be the same as the distance determining unit 160 of FIG. 2. The distance determining unit 260 may transmit and receive a radio wave to and from the member terminals MB1 through MBn, may determine a distance between member terminals based on an intensity of the radio wave received from the member terminals, and may transmit the distance to the control unit 230.

The control unit 230 may receive behavior information from the communication unit 250, may receive the distance between member terminals determined by the distance determining unit 260, and may store the behavior information and the distance in the storage unit 240. Also, the control unit 230 may determine a separation of at least one member terminal of the plurality of member terminals MB1 through MBn from a group based on the determined distances, and when the separation from the group is determined, may output a warning signal to the warning generating unit 270.

The storage unit 240 may receive and store the behavior information through the control unit 230.

The warning generating unit 270 may generate a warning in a preset manner when the warning signal is received from the control unit 230, to enable the leader to perceive the warning. The preset manner may output a warning sound or a name of a corresponding member visually or auditorily.

The control unit 230, the storage unit 240, the communication unit 250, and the distance determining unit 260 of the leader terminal LD may be implemented to be the same as the control unit 130, the storage unit 140, the communication unit 150, and the distance determining unit 160 of the member terminal MB of FIG. 2. Although FIG. 4 shows that the leader terminal LD does not provide elements or components corresponding to the sensor unit 110 and the imaging unit 120 of FIG. 2, the leader terminal LD may include a sensor unit (not shown) and an imaging unit (not shown). The warning generating unit 270 may be provided to the plurality of member terminals MB1 through MBn. The leader terminal LD and the plurality of member terminals MB1 through MBn may be implemented as the same type of device. For example, the leader terminal LD and the plurality of member terminals MB1 through MBn may be implemented as a smart phone.

Figure 5:
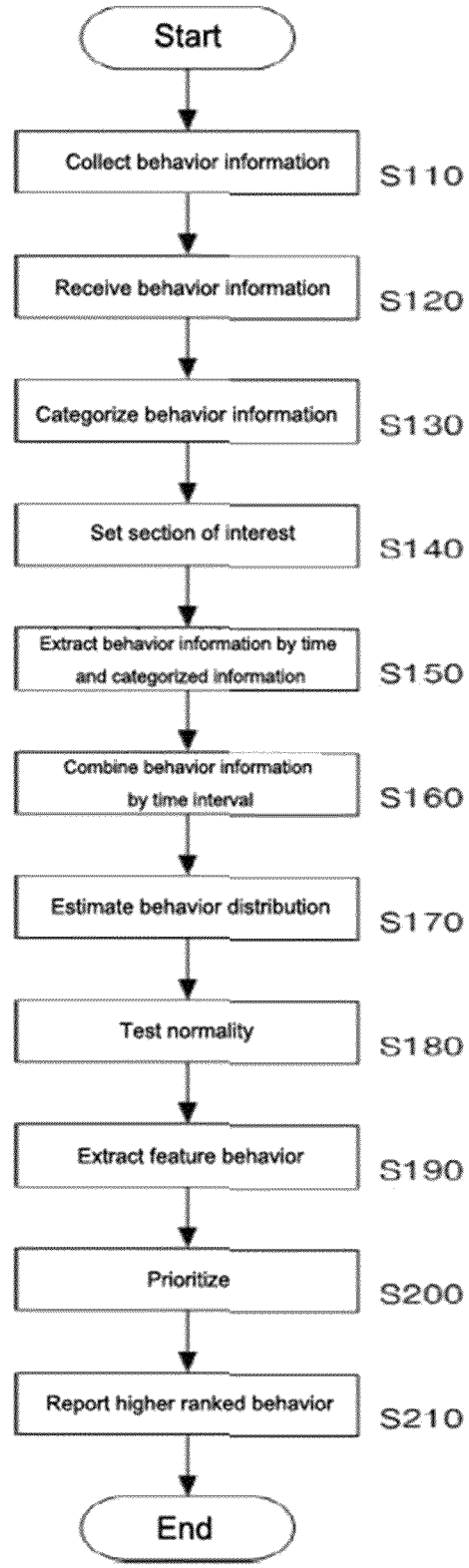
FIG. 5 is a flowchart illustrating a method of monitoring a field trip according to an exemplary embodiment.
Figure 6:
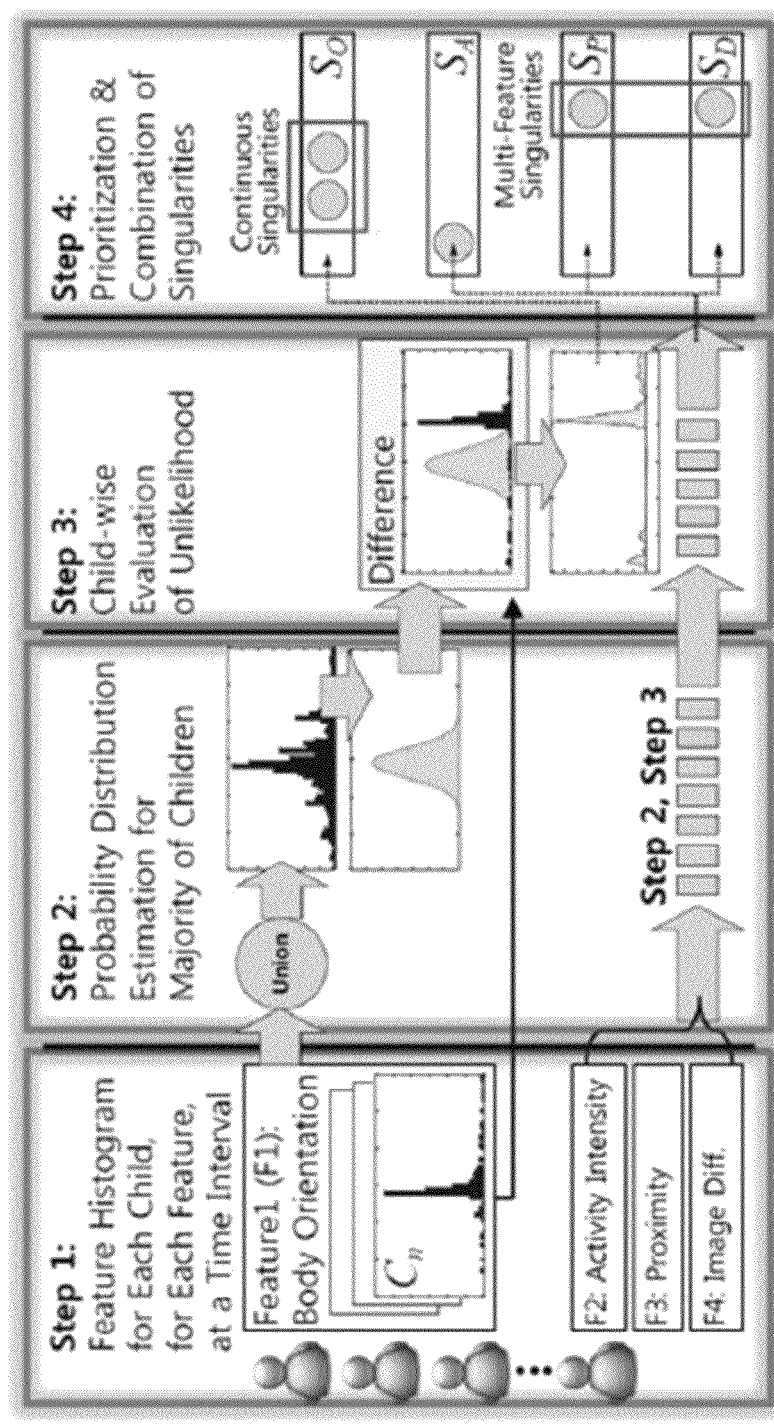
FIG. 6 is a diagram illustrating the method of monitoring a field trip of FIG. 5.
Figure 7:
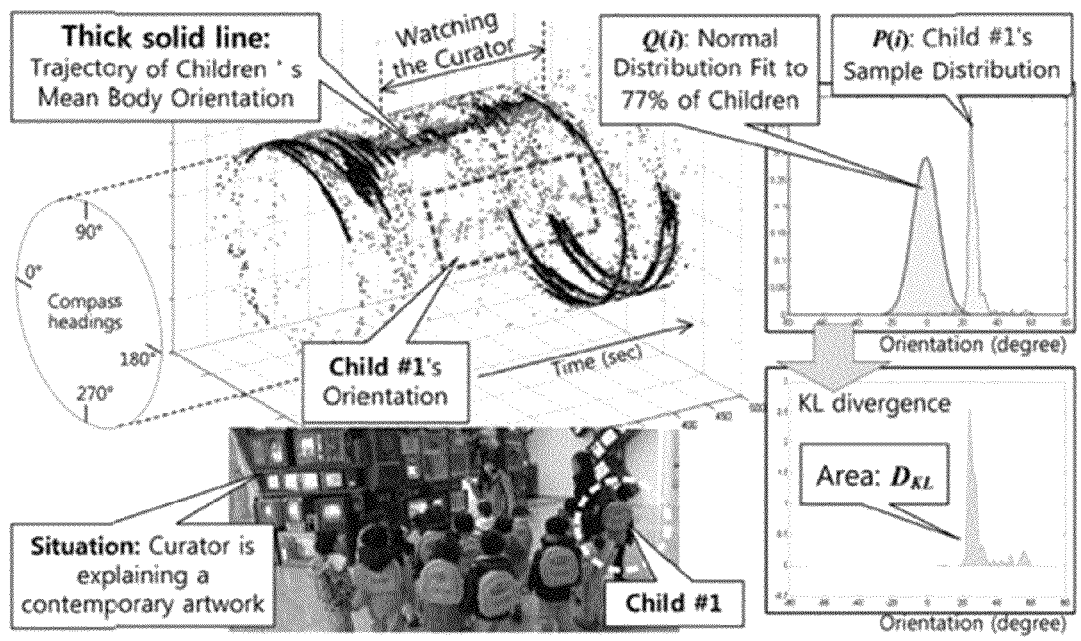
FIG. 7 is a diagram illustrating a method of extracting a feature behavior.

FIG. 5 is a flowchart illustrating a method of monitoring a field trip according to an exemplary embodiment. FIG. 6 is a diagram illustrating the method of FIG. 5. FIG. 7 is a diagram illustrating a method of extracting a feature behavior.

Referring to FIG. 5, the method of monitoring a field trip may collect and store, during a field trip, behavior information of members corresponding, respectively, to a plurality of member terminals MB1 through MBn, and may transmit the behavior information to a leader terminal LD (S110). The leader terminal LD may receive and store all or some of the behavior information for each of the plurality of members from the plurality of member terminals MB1 through MBn.

After the field trip, an analysis terminal CT may receive the behavior information stored in the leader terminal LD and the plurality of member terminals MB1 through MBn (S120). When the analysis terminal CT receives the behavior information, the analysis terminal CT may first receive and store the behavior information stored in the leader terminal LD, and then receive the behavior information stored in the plurality of member terminals MB1 through MBn. According to exemplary embodiments, the analysis terminal CT may not receive the behavior information stored in the plurality of member terminals MB1 through MBn, and thereafter, when a detailed analysis of behavior information of a particular member terminal among the plurality of member terminals MB1 through MBn is required, may receive behavior information from the corresponding member terminal.

When the analysis terminal CT receives the behavior information, the analysis terminal CT may store the behavior information by categorizing the behavior information into body orientation information, activity intensity information, peer proximity information, and image information for each of the plurality of member terminals MB1 through MBn (S130). The body orientation information and the activity intensity information may correspond to sensing values obtained by a compass sensor and an accelerator sensor, respectively. The orientation sensing value obtained by the compass sensor may be categorized as the body orientation information, and the motion sensing value obtained by the accelerator sensor may be categorized as the activity intensity information. Also, an image obtained by an imaging unit may be categorized as image differential information, and a distance between member terminals obtained by a distance determining unit may be categorized as peer proximity information.

The analysis terminal CT may set a section of interest (S140). The section of interest may refer to a time interval in which member behaviors are monitored. In the field trip, only education may not be conducted all the time during the field trip. Many members may want to do personal activities during the field trip. In practice, a considerable amount of time may be allowed for personal activities of the members during the field trip. Also, a need for monitoring may be lower during personal activities than during an actual education. During personal activities, individual activities of the members may be conducted, and thus, recognizing a feature behavior of a particular member may be difficult. Accordingly, the member behaviors may be monitored only for a time interval in which an education activity is substantially conducted. A section of interest may be set to, for example, two hours. The section of interest may be set by the leader directly according to a field trip schedule.

When the section of interest is set, the analysis terminal CT may extract the behavior information for each of the members in a time interval unit T0~Tm within the section of interest for each of the categorized behavior information (S150). Here, m denotes a natural number. The analysis terminal CT may extract the body orientation information, the activity intensity information, the peer proximity information, and the image information for each of the plurality of members in units of preset time intervals, for example, sixty seconds. The analysis terminal CT may extract the four categorized information of the behavior information, namely, the body orientation information, the activity intensity information, the peer proximity information, and the image information for each of the plurality of members per time interval. Referring to Step 1 of FIG. 6, when a number of members is n, a behavior information histogram $C_k$ of a member k being collected for a time interval $T_0=[t_0, t_1]$ ($t_1=t_0+w$) may be obtained. Here, n denotes a natural number, w denotes a window size, for example, sixty seconds, and k denotes a natural number in a range of 1 to n.

Then, the analysis terminal CT may combine the obtained behavior information histograms for each of the plurality of members at the same time interval (S160). The analysis terminal CT may combine all the behavior information histograms of the plurality of members for each of the categorized behavior information corresponding to the same time interval, namely, the body orientation information, the activity intensity information, the peer proximity information, and the image information.

For example, the combining of the behavior information histograms may be represented by Equation 1 using a union function.

$$C_O = C_{O1} \cup C_{O2} \cup \ldots \cup C_{On} \qquad \text{[Equation 1]}$$

Here, $C_O$ denotes a combined body orientation histogram in which body orientation behavior information of n number of members are combined, and $C_{O1}, C_{O2}, \ldots C_{On}$ denote body orientation histograms of individual members.

Although Equation 1 shows a method of combining body orientation information among body orientation information, activity intensity information, peer proximity information, and image differential information, the same method may be applied to the other behavior information. Accordingly, a combined activity intensity histogram $C_A$, a combined peer proximity histogram $C_P$, and a combined image differential histogram $C_D$ may be obtained.

Then, the analysis terminal CT may estimate a behavior distribution corresponding to the combined behavior information histogram per time interval (S170). Assume that the behavior distribution is derived in a form of a normal distribution N of the combined information histogram $C_0, C_A, C_P,$ and $C_D$ per time interval, the behavior distribution may be estimated. The normal distribution N may be configured to accept a maximum number of samples, for example, at least 60% of samples or behavior information of a plurality of members, based on a heuristic method. The normal distribution N may be represented as normal distributions $N_0, N_A, N_P,$ and $N_D$ for each of the behavior information histograms $C_0, C_A, C_P,$ and $C_D$ per time interval. Assume that each of a body orientation behavior distribution $N_0$, an activity intensity behavior distribution $N_A$, a peer proximity behavior distribution $N_P$, and an image differential behavior distribution $N_D$ may be a representation in a form of a normal distribution of the combined body orientation histogram $C_0$, the combined activity intensity histogram $C_A$, the combined peer proximity histogram $C_P$, and the combined image differential histogram $C_D$ per time interval.

However, because the behavior distribution $N_0, N_A, N_P,$ and $N_D$ per time interval is represented in a form of a normal distribution from an assumption, it is required to test whether the behavior distribution $N_0, N_A, N_P,$ and $N_D$ per time interval is actually represented in a form of a normal distribution. Accordingly, because a mean and a variance of the behavior distribution $N_0, N_A, N_P,$ and $N_D$ per time interval is not preset, a normality of the behavior distribution $N_0, N_A, N_P,$ and $N_D$ per time interval may be tested using a Lilliefors test (S180). The Lilliefors test for normality tests may be used to test whether data come from a normal distribution, and may be available when a mean and a variance of a parent group are unknown.

Also, the analysis terminal CT may determine whether each of the behavior distribution $N_0, N_A, N_P,$ and $N_D$ per time interval corresponds to a normal distribution. The analysis terminal CT may determine whether the behavior distribution $N_0, N_A, N_P,$ and $N_D$ per time interval may satisfy a normality.

When the behavior distribution $N_0, N_A, N_P,$ and $N_D$ of a particular time interval, for example, $T_0$, does not satisfy a normality, finding a common activity of the plurality of members at the corresponding time interval may be determined to be difficult. The analysis terminal CT may determine whether the behavior distribution $N_0, N_A, N_P,$ and $N_D$ of a next time interval satisfies normality without extracting a feature from the behavior distribution $N_0, N_A, N_P,$ and $N_D$ of the corresponding time interval.

When the behavior distribution is estimated, a body orientation distribution may be estimated, representing whether body orientation information of the plurality of members at a particular time interval faces in the same direction. Similarly, a peer proximity distribution may be estimated, representing whether the plurality of members are gathered or distributed. An image differential distribution may be estimated, representing whether the same object is being viewed. An activity intensity distribution may be estimated, representing whether most of the plurality of members is in a static or dynamic state.

Referring to Step 2 of FIG. 6, a histogram of the estimated body orientation behavior distribution $N_0$ is illustrated. Although Step 2 of FIG. 6 shows the body orientation behavior distribution $N_0$ at one time interval, the body orientation behavior distribution $N_0$ may be estimated for all the time intervals within a section of interest. Although not shown, the activity intensity behavior distribution $N_A$, the peer proximity behavior distribution $N_P$, and the image differential behavior distribution $N_D$ may be estimated for all the time intervals.

When the behavior distribution $N_0, N_A, N_P,$ and $N_D$ of a particular time interval, for example, $T_0$, may correspond to the normal distribution $N_0, N_A, N_P,$ and $N_D$, respectively, a feature behavior may be analyzed for each member k for each of the histograms per behavior $C_0, C_A, C_P,$ and $C_D$ corresponding to the normal distributions (S190).

The feature behavior may refer to behavior information of a member that is out of a behavior distribution estimated from a plurality of behaviors of members. When an orientation difference between the plurality of members is within a predetermined angle, for example, 10 degrees, as a result of analysis of the body orientation distribution, the plurality of members may be determined to face in the same direction. When an orientation difference between a particular member and the other members is greater than or equal to a predetermined angle, for example, 90 degrees, behavior information of the corresponding member may be determined to correspond to a feature behavior. Similarly, when a plurality of members are distributed within a predetermined distance, for example, 5 m, and a particular member is spaced 10 m or more away from the other members, behavior information of the corresponding member may be determined to correspond to a feature behavior. The feature behavior may be extracted from each of the body orientation distribution, the activity intensity distribution, the peer proximity distribution, and the image differential distribution.

The feature behavior analysis may be conducted using a Kullback-Leibler divergence $D_{KL}$ represented by Equation 2.

$$D_{KL}(P \| Q) = \sum_i P(i) \log \frac{P(i)}{Q(i)} \quad \text{[Equation 2]}$$

Here, P denotes an observed value, to which the histograms per behavior $C_0, C_A, C_P,$ and $C_D$ are substituted for each member k, and Q denotes a model, to which the behavior distributions $N_0, N_A, N_P,$ and $N_D$ are substituted. Also, i denotes a time interval, and corresponds to a natural number in range of 1 to m.

The Kullback-Leibler divergence $D_{KL}$ may be only defined as 0 when $P(i)=Q(i)$ for all i, and otherwise, as $D_{KL}>0$. The Kullback-Leibler divergence $D_{KL}$, also known as a relative entropy, may be a measure of a difference between two different probability distributions. The Kullback-Leibler divergence $D_{KL}$ may analyze quantitatively a difference between the histograms per behavior $C_0, C_A, C_P,$ and $C_D$ and the corresponding behavior distributions $N_0, N_A, N_P,$ and $N_D$ per time interval for each member k.

Accordingly, when the difference between the histograms per behavior $C_0, C_A, C_P,$ and $C_D$ and the corresponding behavior distributions $N_0, N_A, N_P,$ and $N_D$ per time interval is calculated for each member, behavior information of a preset number of members having a largest difference may be extracted as a feature behavior.

In FIG. 7, combined body orientation behavior information, a body orientation behavior distribution $N_O$ of a particular time interval estimated from the combined body orientation behavior information, and a body orientation histogram $C_{Ok}$ of one member are illustrated, along with the Kullback-Leibler divergence $D_{KL}$ calculated from the body orientation behavior distribution $N_O$ and the body orientation histogram $C_{Ok}$ of one member.

Also, behavior information of a member showing a largest difference may be extracted as a body orientation feature behavior $S_O$, an activity intensity feature behavior $S_A$, a peer proximity feature behavior $S_P$, and an image differential feature behavior $S_D$.

Each of the feature behaviors $S_O$, $S_A$, $S_P$, and $S_D$ may include a collection of a member identification k, a time interval TL, and a Kullback-Leibler divergence value $D_{KL}$.

Among the feature behaviors, the peer proximity feature behavior $S_P$ may represent a feature behavior of a group formed with a small number of members, dissimilar to the other feature behaviors $S_O$, $S_A$, and $S_D$ representing a feature behavior of an individual member. The peer proximity feature behavior $S_P$ may be extracted by generating and combining behavior information histograms for a peer proximity data set $P_{ij}$ between at least two or three members and by estimating a behavior distribution, rather than extracting a feature behavior for each of a plurality of members using the above algorithm.

Also, when a member shows the same behavior information for continuous time intervals as a feature behavior among the feature behaviors per time interval, feature behaviors for the same behavior information may be combined and may be assigned with a weight value.

With an increase in the continuous time intervals over which the same feature behavior appears, the weight value for the corresponding feature behavior may be increased.

Then, the combined feature behaviors may be prioritized by arranging the combined feature behaviors in a descending order of the weight value (S200). When priorities of the feature behaviors are set, the analysis terminal CT may display directly a preset number of high-ranked feature behaviors having higher priorities in a case in which the analysis terminal CT is provided with a display device. In addition, the analysis terminal CT may provide a report to the leader by transmitting the preset number of high-ranked feature behaviors having higher priorities to the leader terminal LD or another terminal (not shown) held by the leader (S210).

Accordingly, the leader may easily perceive feature behaviors of the members or students in a field trip.

The leader or teacher may easily perceive a different behavior of a member from behaviors of the other members through a member behavior reported as a feature behavior, and may determine a feature of a member by monitoring behavior information stored in at least one of the analysis terminal CT, the leader terminal LD, and the plurality of member terminals MB1 through MBn. This feature may correspond to a positive feature such as, for example, an interest in a particular field or a negative feature such as, for example, an attention deficit. As the feature of the member is perceived by the leader or teacher, the system and method for monitoring a student behavior in a field trip may provide significant effects on evaluation of academic achievement in learning, understanding of features of individual members or students, and educational assistance.

The method according to an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A behavior monitoring system comprising:
   a plurality of member terminals held respectively by a plurality of members conducting a group activity and configured to collect and store behavior information of the members to match time information, the behavior information including location information, orientation information, view information, and motion information;
   at least one leader terminal held by a leader and configured to receive and store the behavior information of the members collected by the plurality of member terminals; and
   an analysis terminal configured to receive the behavior information from the at least one leader terminal and the plurality of member terminals, to estimate behavior distributions corresponding, respectively, to the location information, the orientation information, the view information, and the motion information included in the received behavior information, and to extract a feature behavior through analysis of a behavior information difference between the plurality of members for the estimated behavior distributions respectively,
   wherein the analysis terminal is configured to obtain a peer proximity histogram, a body orientation histogram, an image differential histogram, and an activity intensity histogram by splitting, in units of preset time intervals, the location information, the orientation information, the view information, and the motion information of the members included in the behavior information received from the plurality of member terminals, and to estimate the behavior distribution by combining the peer proximity histogram, the body orientation histogram, the image differential histogram, and the activity intensity histogram obtained for the plurality of members in units of the preset time intervals.

2. The behavior monitoring system of claim 1, wherein the analysis terminal is configured to determine whether a combined body orientation histogram, a combined activity intensity histogram, a combined peer proximity histogram, and a combined image differential histogram included in the behavior distributions correspond to normal distributions respectively by applying a Lilliefors test to the combined body orientation histogram, the combined activity intensity histogram, the combined peer proximity histogram, and the combined image differential histogram, and to extract the feature behavior respectively from the combined body orientation histogram, the combined activity intensity histogram, the combined peer proximity histogram, and the combined image differential histogram corresponding to the normal distributions.

3. The behavior monitoring system of claim 2, wherein the analysis terminal is configured to calculate differences between the peer proximity histogram, the body orientation histogram, the image differential histogram, and the activity intensity histogram obtained for the plurality of members, and the combined body orientation histogram, the combined activity intensity histogram, the combined peer proximity histogram, and the combined image differential histogram, by applying a Kullback-Leibler divergence, and to extract a preset number of behavior information having a largest difference as the feature behavior.

4. The behavior monitoring system of claim 3, wherein the analysis terminal is configured to accumulate and assign a weight value to a corresponding feature behavior when same information among the location information, the orientation information, the view information, and the motion information included in the behavior information is extracted as the feature behavior over continuous time intervals.

5. The behavior monitoring system of claim 4, wherein the analysis terminal is configured to set priorities of the extracted feature behaviors, to arrange the extracted feature behaviors based on the priorities, and to extract a preset number of higher ranked feature behaviors among the arranged feature behaviors.

6. The behavior monitoring system of claim 1, wherein the plurality of member terminals comprise:
a compass sensor configured to obtain body orientation information of the member;
an accelerator sensor configured to obtain motion information of the member;
an image sensor configured to obtain visual information of the member as image information;
a communication unit configured to communicate with at least one of the at least one leader terminal, the other member terminal, and the analysis terminal;
a distance determining unit configured to determine a distance from the other member terminal by transmitting and receiving a signal of a radio frequency band with the other member terminal; and
a storage unit configured to store the location information, the orientation information, the view information, and the motion information.

7. The behavior monitoring system of claim 1, wherein the at least one leader terminal comprises:
a distance determining unit configured to determine a distance from the other member terminal by transmitting and receiving a signal of a radio frequency band with the plurality of member terminals;
a communication unit configured to communicate with at least one of the plurality of member terminals and the analysis terminal; and
a storage unit configured to store at least one of the location information, the orientation information, the view information, and the motion information received from the plurality of member terminals through the communication unit.

8. A behavior monitoring method for a behavior monitoring system comprising a plurality of member terminals held respectively by a plurality of members conducting a group activity, at least one leader terminal held by a leader, and an analysis terminal, the behavior monitoring method comprising:
receiving, using the analysis terminal, behavior information from the at least one leader terminal and the plurality of member terminals;
estimating behavior distributions corresponding, respectively, to location information, orientation information, view information, and motion information included in the received behavior information; and
extracting a feature behavior through analysis of a behavior information difference between the plurality of members for the estimated behavior distributions respectively,
wherein the estimating of the behavior distributions comprises:
obtaining a peer proximity histogram, a body orientation histogram, an image differential histogram, and an activity intensity histogram, by splitting, in units of preset time intervals, the location information, the orientation information, the view information, and the motion information included in the behavior information of the plurality of members received from the plurality of member terminals; and
estimating the behavior distribution by combining the peer proximity histogram, the body orientation histogram, the image differential histogram, and the activity intensity histogram obtained for the plurality of members in units of the preset time intervals.

9. The behavior monitoring method of claim 8, wherein the extracting of the feature behavior comprises:
determining whether a combined body orientation histogram, a combined activity intensity histogram, a combined peer proximity histogram, and a combined image differential histogram included in the behavior distributions correspond to normal distributions respectively by applying a Lilliefors test to the combined body orientation histogram, the combined activity intensity histogram, the combined peer proximity histogram, and the combined image differential histogram; and
extracting an individual feature behavior from the combined body orientation histogram, the combined activity intensity histogram, the combined peer proximity histogram, and the combined image differential histogram corresponding to the normal distributions respectively.

10. The behavior monitoring method of claim 9, wherein the extracting of the individual feature behavior comprises:
calculating differences between the peer proximity histogram, the body orientation histogram, the image differential histogram, and the activity intensity histogram obtained for the plurality of members, and the combined body orientation histogram, the combined activity intensity histogram, the combined peer proximity histogram, and the combined image differential histogram, by applying a Kullback-Leibler divergence, and extracting a preset number of behavior information having a largest difference as the feature behavior.

11. The behavior monitoring method of claim 10, wherein the extracting of the individual feature behavior further comprises accumulating and assigning a weight value to a corresponding feature behavior when same information among the location information, the orientation information, the view information, and the motion information included in the behavior information is extracted as the feature behavior over continuous time intervals.

12. The behavior monitoring method of claim 11, wherein the extracting of the individual feature behavior further comprises setting priorities of the extracted feature behaviors, arranging the extracted feature behaviors based on the priorities, and extracting a preset number of higher ranked feature behaviors among the arranged feature behaviors.

13. The behavior monitoring method of claim 8, wherein the plurality of member terminals comprise:
- a compass sensor configured to obtain body orientation information of the member;
- an accelerator sensor configured to obtain motion information of the member;
- an image sensor configured to obtain visual information of the member as image information;
- a communication unit configured to communicate with at least one of the at least one leader terminal, the other member terminal, and the analysis terminal;
- a distance determining unit configured to determine a distance from the other member terminal by transmitting and receiving a signal of a radio frequency band with the other member terminal; and
- a storage unit configured to store the location information, the orientation information, the view information, and the motion information.

14. The behavior monitoring method of claim 13, wherein the estimating of the behavior distributions comprises:
- obtaining a peer proximity histogram, a body orientation histogram, an image differential histogram, and an activity intensity histogram, by splitting, in units of preset time intervals, the location information, the orientation information, the view information, and the motion information included in the behavior information of the plurality of members received from the plurality of member terminals; and
- estimating the behavior distribution by combining the peer proximity histogram, the body orientation histogram, the image differential histogram, and the activity intensity histogram obtained for the plurality of members in units of the preset time intervals.

15. The behavior monitoring method of claim 14, wherein the extracting of the feature behavior comprises:
- determining whether a combined body orientation histogram, a combined activity intensity histogram, a combined peer proximity histogram, and a combined image differential histogram included in the behavior distributions correspond to normal distributions respectively by applying a Lilliefors test to the combined body orientation histogram, the combined activity intensity histogram, the combined peer proximity histogram, and the combined image differential histogram; and
- extracting an individual feature behavior from the combined body orientation histogram, the combined activity intensity histogram, the combined peer proximity histogram, and the combined image differential histogram corresponding to the normal distributions respectively.

16. The behavior monitoring method of claim 8, wherein the at least one leader terminal comprises:
- a distance determining unit configured to determine a distance from the other member terminal by transmitting and receiving a signal of a radio frequency band with the plurality of member terminals;
- a communication unit configured to communicate with at least one of the plurality of member terminals and the analysis terminal; and
- a storage unit configured to store at least one of the location information, the orientation information, the view information, and the motion information received from the plurality of member terminals through the communication unit.

17. The behavior monitoring method of claim 16, wherein the estimating of the behavior distributions comprises:
- obtaining a peer proximity histogram, a body orientation histogram, an image differential histogram, and an activity intensity histogram, by splitting, in units of preset time intervals, the location information, the orientation information, the view information, and the motion information included in the behavior information of the plurality of members received from the plurality of member terminals; and
- estimating the behavior distribution by combining the peer proximity histogram, the body orientation histogram, the image differential histogram, and the activity intensity histogram obtained for the plurality of members in units of the preset time intervals.

18. The behavior monitoring method of claim 17, wherein the extracting of the feature behavior comprises:
- determining whether a combined body orientation histogram, a combined activity intensity histogram, a combined peer proximity histogram, and a combined image differential histogram included in the behavior distributions correspond to normal distributions respectively by applying a Lilliefors test to the combined body orientation histogram, the combined activity intensity histogram, the combined peer proximity histogram, and the combined image differential histogram; and
- extracting an individual feature behavior from the combined body orientation histogram, the combined activity intensity histogram, the combined peer proximity histogram, and the combined image differential histogram corresponding to the normal distributions respectively.

* * * * *